(12) United States Patent
Malpani et al.

(10) Patent No.: US 8,281,368 B2
(45) Date of Patent: Oct. 2, 2012

(54) COMMUNICATING A PASSWORD SECURELY

(75) Inventors: Raghavendra Malpani, Redmond, WA (US); Cristian Ilac, Sammamish, WA (US); Tanmoy Dutta, Redmond, WA (US); Klaus Schultz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 792 days.

(21) Appl. No.: 12/038,815

(22) Filed: Feb. 28, 2008

(65) Prior Publication Data

US 2009/0222888 A1 Sep. 3, 2009

(51) Int. Cl.
*G06F 7/04* (2006.01)
*G06F 15/16* (2006.01)
*G06F 17/30* (2006.01)
*H04L 29/06* (2006.01)

(52) U.S. Cl. .......................................................... 726/3
(58) Field of Classification Search ........................ 726/3
See application file for complete search history.

(56) References Cited

U.S. PATENT DOCUMENTS

| | | | |
|---|---|---|---|
| 2004/0019808 A1* | 1/2004 | Devine et al. ................. 713/201 |
| 2004/0098595 A1* | 5/2004 | Aupperle et al. ............. 713/185 |
| 2004/0167749 A1* | 8/2004 | Friedman et al. ............ 702/186 |

* cited by examiner

*Primary Examiner* — Kambiz Zand
*Assistant Examiner* — Stephen Sanders
(74) *Attorney, Agent, or Firm* — Microsoft Corporation

(57) ABSTRACT

A secure (e.g., HTTPS) connection is established between a client and a server. Communication over the connection may utilize an application (e.g., a Web browser) that is not part of the client's trusted computing base. A password is sent from the client to the server over the connection such that the clear text password is unavailable to the application. For example, the password can be encrypted and inserted directly into the HTTPS stream from the client's trusted computing base.

20 Claims, 3 Drawing Sheets

COMMUNICATING A PASSWORD SECURELY

BACKGROUND

A Web browser is used to access a Web site via the World Wide Web or via a local area network. Often a password is required in order to access restricted Web sites or Web pages, such as those used for online banking or for other types of transactions where security is desired. For added security, the connection between the user and the Web site—that is, the connection between the user's client device and the server hosting the Web site—can use a scheme such as HTTPS (Hyper Text Transfer Protocol Secure).

Nevertheless, there are existing form filler solutions that plug into Web browsers and act like password managers but allow unsecure and low integrity processes to have access to a user's password. These processes, as well as the Web browsers themselves, are susceptible to "malware" that can be used to steal a user's password. Also, techniques such as "phishing" and "screen scraping" can be used to steal a user's password. With the password, an adversary can gain access to private data and conduct unauthorized transactions, masquerading as the password's owner.

Accordingly, there is a need to improve the manner in which passwords are handled and protected.

SUMMARY

A secure (e.g., HTTPS) connection may be established between a client and a server. Communication over the connection may utilize an application (such as, but not limited to, a Web browser) that is not part of the client's trusted computing base (TCB). A password is sent from the client to the server over the connection such that the password is not available to the application in clear text. The password is encrypted and inserted directly into the secure connection from the client's TCB.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The accompanying drawings, which are incorporated in and form a part of this specification, illustrate embodiments and, together with the description, serve to explain the principles of the embodiments.

DETAILED DESCRIPTION

Figure 1:
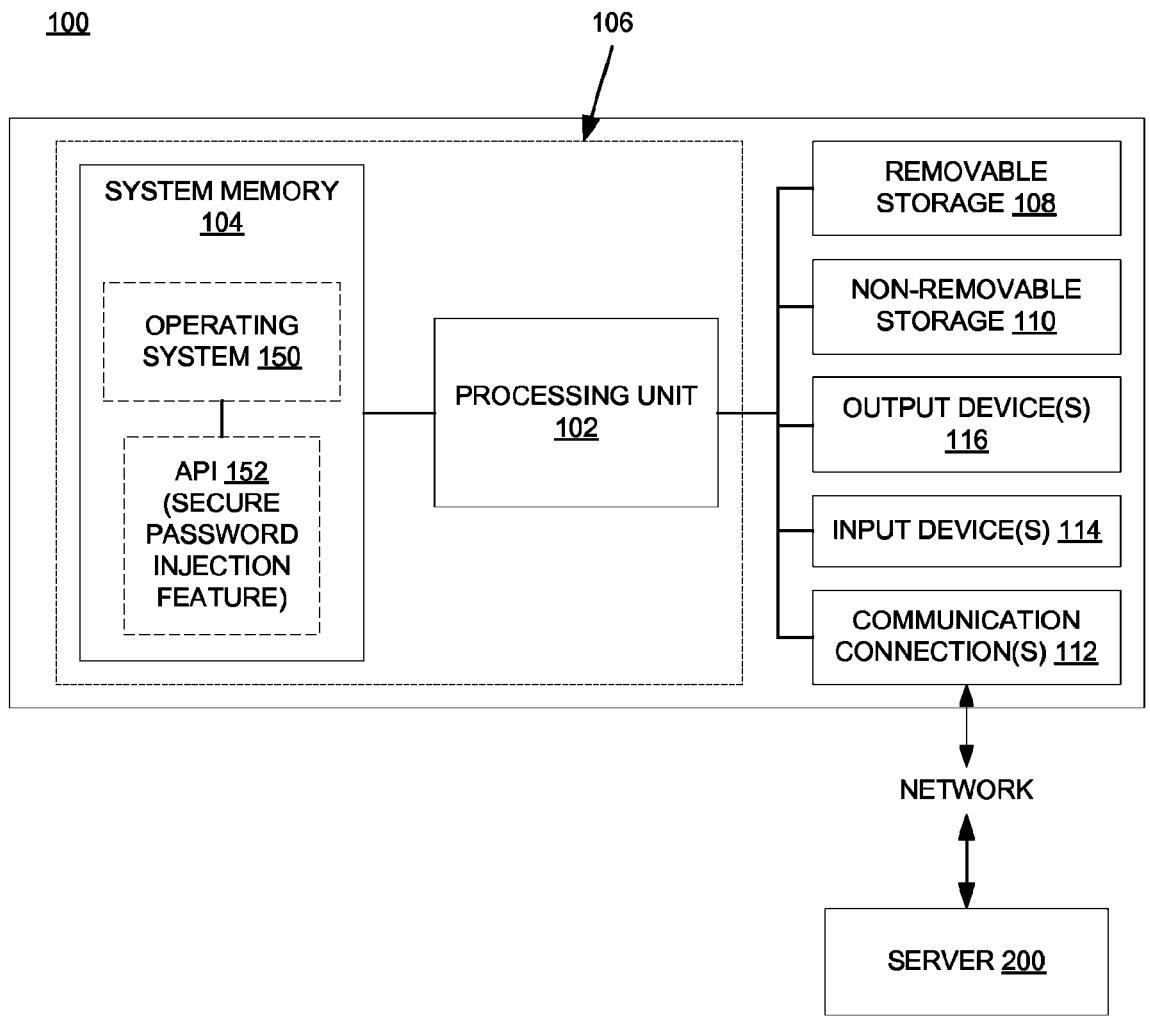
FIG. 1 is a block diagram showing elements of a computer system environment in one embodiment.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "establishing," "sending," "performing," "substituting," "storing," "inserting," "validating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

FIG. 1 is a block diagram showing elements of a computer system environment in one embodiment. FIG. 1 shows a block diagram of one embodiment of an exemplary computer system 100 upon which embodiments described herein may be implemented. The system 100 may also be referred to herein as a client or client device.

In its most basic configuration, the system 100 includes at least one processing unit 102 and a memory 104. Depending on the exact configuration and type of computing device, the memory 104 may be volatile (such as RAM), non-volatile (such as ROM, flash memory, etc.) or some combination of the two. This most basic configuration is illustrated in FIG. 1 by dashed line 106. The system 100 may also have additional features/functionality. For example, the system 100 may also include additional storage (removable and/or non-removable) including, but not limited to, magnetic or optical disks or tape. Such additional storage is illustrated in FIG. 1 by removable storage 108 and non-removable storage 110.

The system 100 may also have input device(s) 114 such as a keyboard, mouse, pen, voice input device, touch input device, etc. Output device(s) 116 such as a display, speakers, printer, etc. may also be included. All these devices are well know in the art and need not be discussed at length here.

The system 100 may operate in a networked environment using logical connections to one or more remote servers (e.g., a Web server 200), which instead may be a personal computer (PC), a router, a network PC, a peer device or other common network node, and which may include many or all of the elements described above relative to the system 100. The logical connections may include a local area network (LAN) and a wide area network (WAN), but may also include other networks. Such networking environments are commonplace in offices, enterprise-wide computer networks, intranets and the Internet. When used in a networking environment, the system 100 can be connected to the network through communication connection(s) 112.

In the example of FIG. 1, the memory 104 includes computer-readable instructions, data structures, program modules and the like associated with an operating system 150, such as but not limited to the WINDOWS™ brand operating system. In the present embodiment, the operating system 150 executes a service identified herein as secure password injection. With regard to the embodiments described herein, the broadest definition of the term "password" is intended—in general, a password is a secret word or phrase, and therefore as used herein a password refers to any word or phrase, including artificial compound words, combinations of numbers and symbols, etc., intended to be secret. In the present embodiment, the secure password injection service is implemented using an application program interface (API) 152, described further in conjunction with FIG. 2 below.

Figure 2:
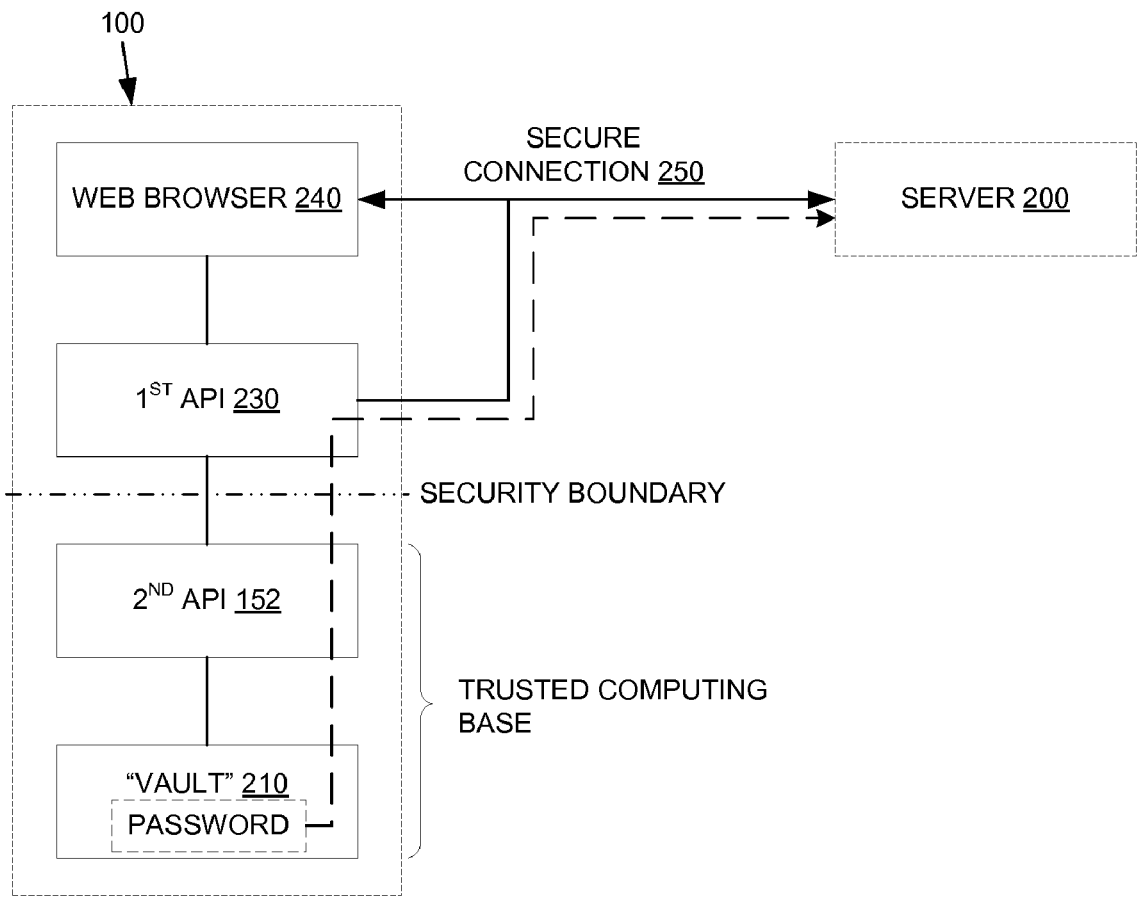
FIG. 2 is a block diagram showing elements of a password security system in one embodiment.

FIG. 2 is a block diagram showing elements of a password security service or system in one embodiment. In the example of FIG. 2, the password security system includes the API 152, which may be referred to herein as "the second API" to distinguish it from an API 230 (which may be referred to herein as "the first API"). An example of an API 152 is the Secure Channel (SChannel) security package of WINDOWS™, modified to incorporate the secure password injection feature mentioned above.

In general, the first API 230 can be used to establish a secure connection 250 (e.g., an HTTPS connection) between a client device (e.g., system 100) and a server 200 (specifically, between the client and a target Web site serviced by the server). An example of an API 230 is the WINDOWS™ Internet application, generally referred to as "WinINet."

In the example of FIG. 2, a password is stored in a secure location, referred to herein as vault 210. In general, the vault 210 represents a collection of credentials (e.g., passwords—secret words or phrases that may also include user names, etc.) that are used by a user to access secure Web sites. A user may use a different user name, password, certificate, etc., for each Web site. The vault 210 can be protected, and can be unlocked or locked in response to user action. In one embodiment, the vault 210 is implemented on the system 100 as part of the Local Security Authority (LSA) of WINDOWS™. In another embodiment, the vault 210 does not reside on the system 100. That is, instead of residing in memory of the system 100, the vault 210 may reside in memory on a "smart card" that is used in conjunction with the system 100 to access a secure Web site.

The vault 210 and the second API 152 are part of the trusted computing base (TCB) of the system 100. Generally speaking, "TCB" is a term of art that refers to the hardware, firmware and software that are critical to maintaining the security of the system 100. In the example of FIG. 2, the first API 230 is outside of the TCB, though this need not be the case.

The first API 230 is the communication layer that sends data (e.g., a password) that is processed (encrypted) by the second API 152. When a user signs on to a secure Web site via the secure connection 250 established by the first API 230, the second API 152 can be used to insert or inject the secure (encrypted) password directly into the secure connection 250 via the first API. As a result, the Web browser 240 and any other less secure applications do not receive the clear text (plain text) password. More specifically, the clear text password is not available to the browser's address space or to the address space of other less secure applications. The password may bypass the Web browser 240, and other less secure applications, using a logical bypass in which the password flows through the first API 230 in such a way that the security of the password is not compromised (e.g., by encrypting it using a key known only to the TCB), or using a physical bypass.

A "password cookie" can be used to provide the second API 152 with enough information (e.g., a hash of various uniquely identifying parts) to locate the password when the password is injected; however, the password cookie does not contain enough information for the first API 230 to reconstruct the password.

Figure 3:
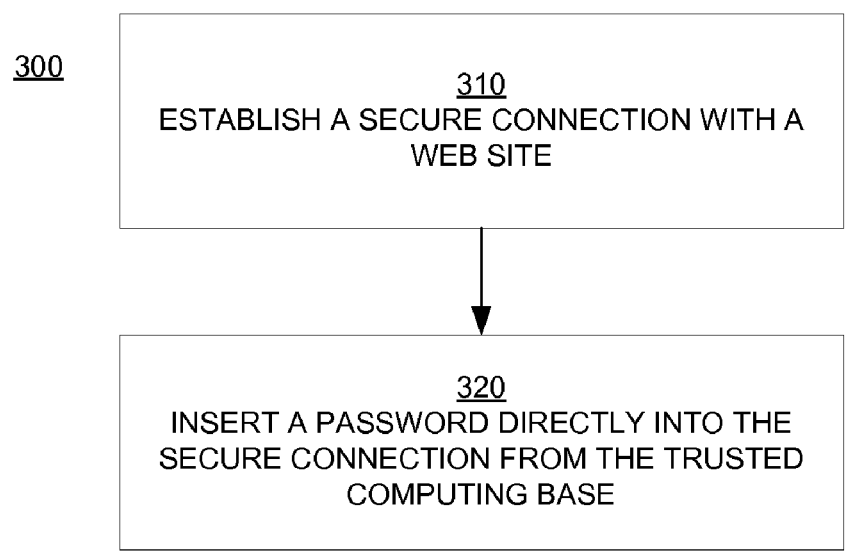
FIG. 3 is a flowchart of one embodiment of a method for communicating passwords securely.

FIG. 3 is a flowchart 300 that illustrates a sequence of operations that take place to provide password security according to one embodiment. Although specific steps are disclosed in the flowchart 300, such steps are exemplary. That is, various other steps or variations of the steps recited in the flowchart 300 can be performed. The steps in the flowchart 300 may be performed in an order different than presented. Furthermore, the features of the various embodiments described by the flowchart 300 can be used alone or in combination with each other. In one embodiment, the flowchart 300 can be implemented by the system 100 (FIG. 1) as computer-readable program instructions stored in a memory unit and executed by a processor. FIG. 3 is described in combination with FIG. 2.

In block 310, a handshake is performed with a secure Web site to establish a secure (e.g., HTTPS) connection. As part of the handshake, the client device (e.g., the system 100) and the Web server 200 agree on a cipher to be used, negotiate a session key, and perform other steps needed to establish a secure connection; such steps are known in the art. In one embodiment, the first API 230 (e.g., WinINet) participates in the handshake on the client side. In one embodiment, the first API 230 notifies the LSA (or the like) that the secure password injection feature will be used.

Around the time of the handshake, the first API 230 can also notify the second API 152 that the secure password injection feature is to be used. The first API 230 can also inquire if credentials are available for the target Web site, without necessarily receiving the credentials.

Significantly, the session key is not transferred to the Web browser 240. Subsequent calls to encrypt or decrypt information are not executed by the Web browser but are instead handled within the TCB (e.g., by the LSA). The Web browser 240 may be notified that the secure password injection feature is being used, so that the Web browser can proceed as if a password is being entered in a conventional manner. More specifically, the Web browser 240 may be notified that a password for the target Web site already exists in the vault 210.

In block 320, at least the password associated with the target Web site is encrypted using the aforementioned key and injected directly into the secure connection (e.g., into the HTTPS stream). Other information, whether secret or not—such as a user name—may be similarly injected directly into the secure connection. In one embodiment, the password is injected into the secure connection by the second API 152 (e.g., by an appropriately modified SChannel API), via the first API 230 as described above. In one embodiment, the appropriate password (that is, the password associated with the target Web site) is located in the vault 210 by the first API 230 (e.g., by WinINet).

The second API 152 can also be used to ensure that the server certificate validation (including server name validation) occurs correctly. That is, the second API 152 can validate the server's certificate regardless of whether the Web browser 240 requests credential validation. This can be important to prevent phishing, as described further below.

In actual practice, from a user's perspective, embodiments described herein can be implemented as follows. A user populates the vault 210 with at least a password for a Web site. Different passwords can be associated with different Web sites. The vault 210 can be populated with other information, such as user names and certificates, for each Web site.

Various techniques can be used to populate the vault 210 with passwords and the like. For example, the user can execute an applet that allows passwords to be securely entered into the vault 210. Alternatively, when a user first accesses a secure Web site and creates a password for that Web site, the password can be automatically added to the vault 210. A password for a Web site can be collected online using a secure facility of the operating system (such as a "secure desktop" in WINDOWS™) if a password for that Web site is not in the vault 210.

The user may then subsequently access a Web site via a secure connection. In a conventional manner, the Web browser 240 presents the user with a log-in screen containing at least a password field and perhaps a user name field. In one embodiment, the password is retrieved from the vault 210, encrypted and injected directly into the secure connection as previously described herein. That is, the user is not required to enter information into the password field of the log-in screen. Provisioning of the Web site with the secure password is thus transparent to the user.

The user may still be required to enter a user name into the log-in screen. Alternatively, the user name may be provided via the secure connection along with the password if access to the Web site is set up to occur in this manner (e.g., the user name is included in the vault 210).

Thus, a secure Web site is provided with a password directly from the vault 210 via a secure connection. As a result, passwords and the like need not be made available to Web browsers or, for that matter, to any low security application. Accordingly, malware or screen scraping cannot successfully steal a password or the like from a low security application such as a Web browser.

Malware can be prevented from accessing the vault 210 using a variety of mechanisms. For example, each time the Web browser 240 attempts to access the vault 210 for automatic sign-on, a confirmation prompt can be provided, perhaps using a secure facility of the operating system, such as a secure desktop in WINDOWS™. Policies can be implemented to control the level of security.

The secure password injection feature described herein can also prevent phishing. According to embodiments described herein, the password is only injected automatically when both of the following conditions are met: a) the vault 210 has credentials for the target Web site; and b) the subject name on the server certificate presented to the client matches that of the target Web site. Accordingly, if the name of the Web site is changed even slightly, then neither of these conditions will be met. On the other hand, if malware executing on the Web browser indicates it is connecting to the target Web site when it is actually connecting to the phisher's Web server, then the second condition will not be met.

In addition to the examples above, other forms of validation can be implemented based on the binding between the password metadata stored in the vault 210 and a respective Web site.

In summary, embodiments described herein improve the manner in which passwords are handled and protected. In the foregoing specification, embodiments have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method for securely injecting data into one or more secure connections, executed at least in part via a processing unit, comprising:
responsive to receiving an indication that a web browser received a log-in screen for a website, logging in to the website without a user entering information into the log-in screen by:
retrieving data from a trusted computing base; and
bypassing, via a secure boundary application program interface (API), the web browser, that is connected to a server via a connection, while securely injecting and rerouting, via the secure boundary API, the retrieved data into secure connection that does not comprise any web browsers, the secure boundary API connected to the server via the secure connection, the secure boundary API connected to the bypassed web browser via a second connection, the web browser and the secure boundary API both comprised in a same computer, the connection not the same as the secure connection, the connection not the same as the second connection, the secure connection not the same as the second connection.

2. The method of claim 1, the data comprising at least one of one or more credentials, passwords, user names, or certificates.

3. The method of claim 1, the trusted computing base comprised in the same computer.

4. The method of claim 1, comprising establishing at least one secure connection into which the retrieved data is injected via at least one application program interface (API) performing one or more handshakes with one or more web sites hosted by at least one server.

5. The method of claim 4, comprising inquiring for one or more credentials from at least one of the web sites.

6. The method of claim 1, the bypassing comprising at least one of a logical bypass or a physical bypass.

7. The method of claim 6, the logical bypass comprising encrypting the data based at least in part on a key exclusive to the trusted computing base.

8. The method of claim 1, comprising locating the injected data based at least in part on one or more data cookies comprising at least one hash of uniquely identified parts.

9. The method of claim 1, comprising communicating one or more subsequent secure data calls via a connection from the trusted computing base to at least one secure connection.

10. The method of claim 1, comprising injecting the retrieved data such that clear text of the data is unavailable to at least one bypassed web browser.

11. A system for securely injecting data into one or more secure connections, comprising:
 a trusted computing base, implemented at least in part via a processing unit, comprising a vault comprising data and a secure boundary application program interface (API),
  the secure boundary API configured to establish a secure connection to server, the secure connection not comprising any web browsers,
 a client comprising the trusted computing base, the secure boundary API, and a web browser that is connected to the server via a connection and that is connected to the secure boundary API via a second connection,
  the secure boundary API configured to securely inject the data into the secure connection based at least in part on bypassing the web browser, the connection not the same as the secure connection, the connection not the same as the second connection, the secure connection not the same as the second connection, and
  the secure boundary API configured to notify the web browser that the data is at least partially securely injected into the secure connection based at least in part on the bypassing the web browser, where a communication, of the web browser with a website that is associated with the server, is based at least in part upon the notification.

12. The system of claim 11, comprising at least one API comprising at least one of an internet application, a wininet application, or a secure channel (schannel).

13. The system of claim 11, comprising at least one API configured to accept one or more cookies which enable at least one API to locate the injected data.

14. The system of claim 11, comprising at least one API configured to perform one or more handshakes with one or more web sites hosted by at least one server.

15. The system of claim 14, comprising at least one API configured to inquire for one or more credentials from at least one web site.

16. The system of claim 11, the trusted computing base configured to execute subsequent data calls by communicating directly with at least one secure connection.

17. A computer-readable storage device comprising computer-executable instructions, which when executed at least in part via a processor on a computer perform acts, comprising:
 retrieving data from a trusted computing base; and
 bypassing, via a secure boundary application program interface (API), web browser, that is connected to a server via a connection, while securely injecting and rerouting, via the secure boundary API, the retrieved data into a secure connection that does not comprise any web browsers, the secure boundary API connected to the server via the secure connection, the secure boundary API connected to the bypassed web browser via a second connection, the web browser and the secure boundary API both comprised in a same computer, the connection not the same as the secure connection, the connection not the same as the second connection, the secure connection not the same as the second connection.

18. The computer-readable storage device of claim 17, comprising establishing at least one secure connection into which the retrieved data is injected via at least one application program interface (API) performing one or more handshakes with one or more web sites hosted by at least one server.

19. The computer-readable storage device of claim 17, comprising inquiring for one or more credentials from at least one of the web site.

20. The computer-readable storage device of claim 17, comprising locating the injected data based at least in part on one or more data cookies comprising at least one hash of uniquely identified parts.

* * * * *